United States Patent [19]
Morris

[11] 3,905,102
[45] Sept. 16, 1975

[54] SHEET METAL CUTTER

[76] Inventor: Charles F. Morris, P.O. Box 223, Tenino, Wash. 98589

[22] Filed: Aug. 26, 1974

[21] Appl. No.: 500,349

[52] U.S. Cl................................... 30/194; 30/258
[51] Int. Cl.² ......................................... B26B 13/08
[58] Field of Search ............. 30/249, 250, 258, 241, 30/252, 259, 194

[56] References Cited
UNITED STATES PATENTS

| | | | |
|---|---|---|---|
| 1,812,350 | 6/1931 | Lingwood | 30/258 X |
| 2,542,103 | 2/1951 | Adel | 30/241 |
| 2,632,246 | 3/1953 | Shoffner | 30/258 |
| 3,412,466 | 11/1968 | Kurosaki | 30/228 |
| 3,772,782 | 11/1973 | Hunt | 30/249 |

Primary Examiner—Al Lawrence Smith
Assistant Examiner—J. C. Peters

[57] ABSTRACT

A sheet metal cutting tool designed to be operated with both hands, of a chipper type as apposed to a shear type, with a rounded head pivoted in the center, with two sawtooth shaped teeth having chisel type points pointed in opposite directions on the perimeter of the roundish head, each for cutting, in a separate operation, two opposite directions, toward the handles and away from the handles. The tooth being pushed, as the blade head is being turned, begins to cut out a chip as its point chisels thru the sheet, being cut, cutting off a chip and completes cutting the sides of the chip as the tooth enters a receiver slot snugly fit to the cutter head. The leverage for cutting is derived from rather long blades or handles in comparison to the distance from the pivot pin to the cutter teeth. This tool is very simple to operate by bringing the two blades, levers, apart and together for cutting, and very simple to assemble, having just two main parts. It is very adaptable to many speeds of cutting and thicknesses of metal to be cut, by varying the tooth size and thickness and by changing the ratio of leverage.

3 Claims, 3 Drawing Figures

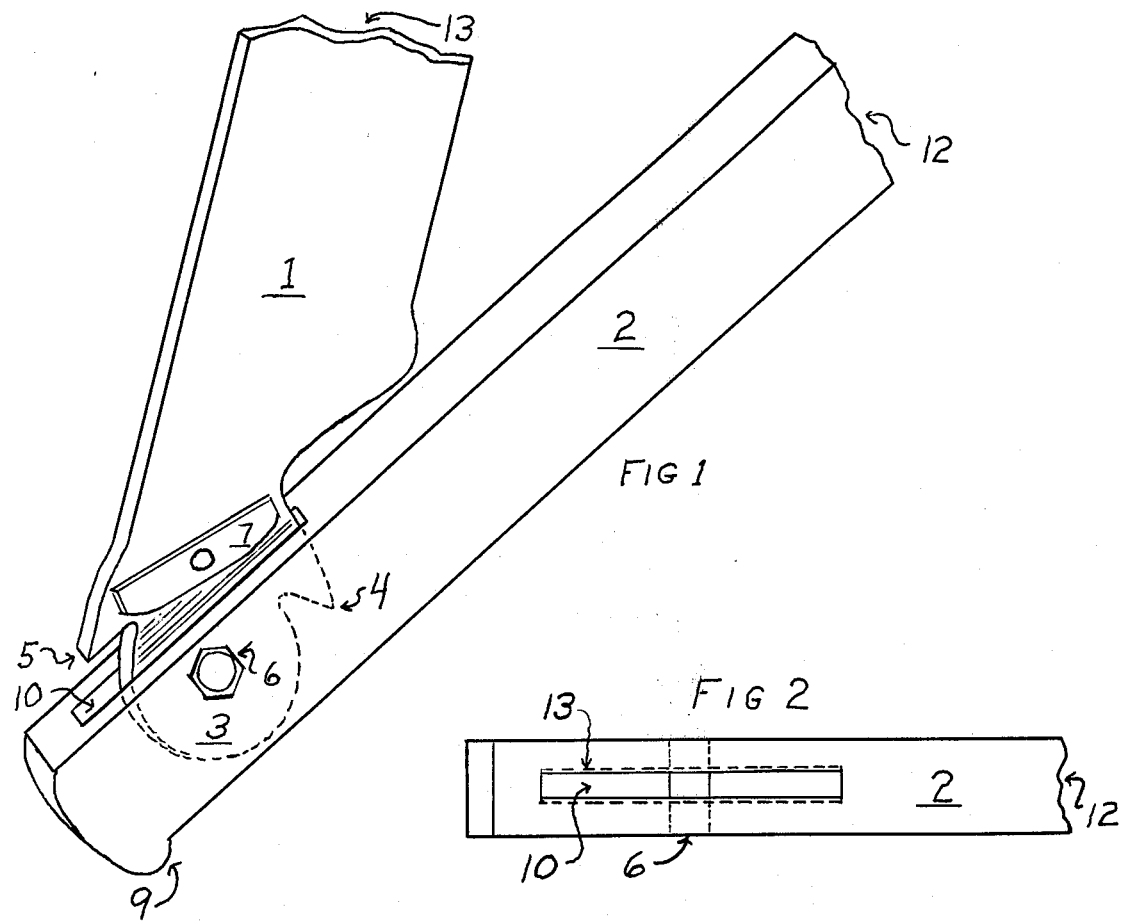
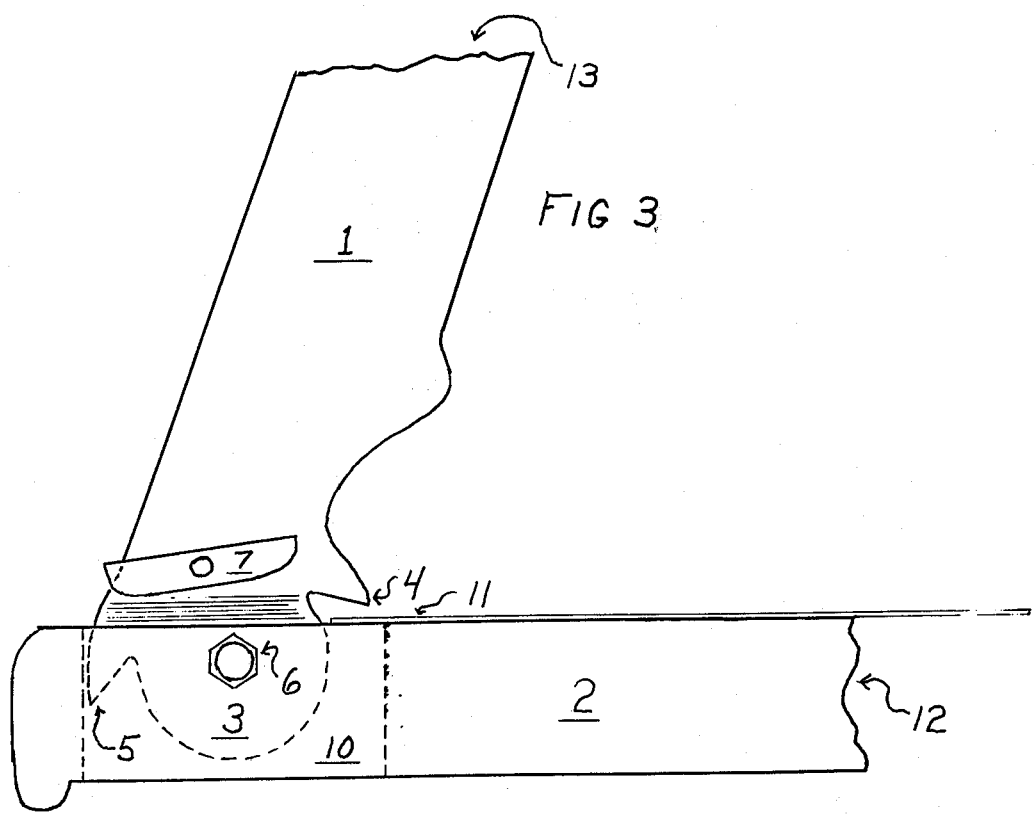

3,905,102

SHEET METAL CUTTER

SUMMARY OF THE INVENTION

There has been a need of a hand operated sheet metal cutter that would cut larger sheets of metal without such a struggle and distortion of the sheet when it was cut. This invention serves that purpose very satisfactorily, as the model tool has proven, because the cut is sufficiently wide to allow free movement of the tool thru the cut and the sheet as it is being cut passes freely between the two handles or levers, thus the receiver blade can be placed on a bench or the floor, and by a pumping action of the cutter blade lever to make the cut, the cutter tool can be moved easily thru the sheet with the receiver sliding along under the sheet as the cut is being made. Even the thickest of sheet metal can be cut with ease with this cutter, and with only very slight distortion of the metal sheet.

BRIEF DESCRIPTION OF THE DRAWINGS

Since both are relatively long in comparison to the cutter head, the cutter blade has been shortened at 13 and the receiver blade at 12 in the drawing FIGURES. This was done in order to show better detail of the parts and features of the cutter pertinent to the invention. The model has about equal total length of the cutter blade and the total length of the receiver blade of about 2 feet, the head of the cutter is nearly to scale of the drawings.

FIG. 1 is a full view of the assembled cutter in a perspective view, ready to make a forward cut, in a direction away from the handles.

FIG. 2 is a top view of the receiver and the slot into which the cutter blade head is inserted and pivoted when the cutter is assembled.

FIG. 3 is a side view of the assembled cutter in position to make a backward cut, in a direction toward the handles.

DETAILED DESCRIPTION

This hand operated sheet metal cutter is unique in its method of cutting and the design of its cutting head 3 as shown in both FIG. 1 and FIG. 3, and the receiver 2 as shown in FIG. 1 and FIG. 2. The cutting head is shaped basically round, and pivoted by a pin 6 which goes thru the center of the roundish head across the horizontal center of the receiver slot 10 and thru both sides of the receiver 2 near the top, toward the cutter blade. There are two sawtooth shaped teeth 4 and 5 pointed in opposite directions on the outer edge of this basic round and extending outward from the perimeter of this round. These teeth are spaced approximately a half circle distance apart, and each used in a separate operation, for cutting in only one of the two directions that the cutter will cut, as shown in FIG. 1 and FIG. 3. The teeth are sharp pointed, but flat pointed, chisel type as shown in FIG. 1, and slightly wider, thicker, then that shaded portion of the cutter blade head 3 immediatly under the tilt plate 7 and just above the receiver slot when the cutter blade is in either of the two positions to start a cut, as shown in FIG. 1 and FIG. 3; this being the portion of the blade head that passes thru the cut, and is machined or ground thinner or more narrow than the thickness of the teeth. The differece of thickness of this thinner blade head portion, shaded in the drawing FIG. 1 and 3, and the teeth allows free passage of the cutter thru its cut in the sheet.

The cutter blade receiver 2 as shown in most detail in FIG. 2 has a slot 10 which is slightly longer than the shortest distance between the points of the two cutter teeth 4 and 5 on the cutter blade and snug fitted at top side, toward the cutter blade when it is inserted. Snug fitted meaning, snug fitted to the sides of the center, pivoted portion of the cutter blade head 3 and the sides of both cutter teeth 4 and 5. The slot 10 is expanded or tapered wider toward the bottom, the opening furthest from the cutter handle, enough to allow free fall of the cut chips out of the slot thru the bottom opening, shown in FIG. 2 by broken line 13.

As shown in FIG. 3 the cutter is in position to start a backward cut toward the handles and the sheet 11 is in position for this cut. As the receiver and cutter blade are brought toward each other the sharp point of tooth 4 is pushed thru by the cutter blade, thus the chip length is cut off, after which the tooth 4 as it enters the receiver slot 10 cuts out the rest of the chip. The cutting motion is in a circular direction toward the receiver slot, by the tooth 4 being pushed thru the sheet 11 by the cutter blade 1. The chip falls free and easily out the bottom of the receiver slot 10. An outward projection 9 on the receiver bottom end allows better chip clearance when receiver 2 is placed against a surface, and helps in sliding the cutter along. After the chip has been cut the cutter blade and the receiver are moved apart raising the tooth 4 out of the receiver slot and above the sheet so the sheet and the cutter can be moved toward each other for the next chip cut. After the cutter has entered the sheet a short distance, the tilt plate 7 holds the sheet down against the receiver when the tooth 4 is withdrawn from its cut. Leverage and ease of cutting come from the relatively long total length of the receiver lever and total length of the cutter blade lever in comparison to the distance between cutter teeth 4 and 5 and the pivot position of the cutter head at pivot pin 6.

Since this cutter is designed for two hand, two lever, operation and the cutter tooth and the cutter lever are on the same side of the receiver blade lever the cutter moves thru the cut sheet with the receiver 2 on one side of the sheet and the cutter blade on the opposite side, the sheet being cut going between them, the receiver blade can be placed upon a bench or the floor, and while making the cut by pumping with the cutter blade lever, the receiver lever can be moved or slid along under the sheet. This is very convenient for cutting larger sheets of metal, and requires little physical exertion.

Also, since this is a two lever cutter, as apposed to a plier or handle grip trigger type cutter, and the sheet being cut passes between the two layers, the receiver lever could be attached to a bench or some solid surface, thus making a fixed position cutter, which would cut by just using a pump action with the cutter blade lever.

Since the cutting teeth are both in a position closer to the receiver slot and the receiver blade lever, than the cutter lever hand position or pressure power source, but on the same side of the receiver the teeth are pushed thru the sheet to make the cut, as opposed to being pulled or carried thru, and in a circular movement as opposed to straight up or straight down, due to the round head of the cutter pivoted in the center.

The teeth being pushed thru the sheet by the cutter blade lever, the circular direction in which they are pushed thru, and the position of the teeth relative to, and as part of the round cutter head, are a distinct advantage of this cutter for cutting thick sheet metal. As can be understood from FIG. 1 or FIG. 3 the pressure or stress applied to the tooth and tooth point from the metal sheet as the tooth is pushed thru, is always very much in the direction toward the mass of the cutter blade, instead of outward or away from the head; thus, proportionately there is little stress or strain at the hook or elbow of the tooth. The model cutter has cut sheet iron near one tenth of an inch thick and aluminum over one-eighth of an inch thick without difficulty.

The size or width of the teeth, the size of the head, or the length of the two levers of this cutter are in no way critically limited, so this cutter, without changing the principle or the invention, could be made practical for cutting many types and thicknesses of sheet metal.

This cutter as used in a forward cut, away from the handles, is shown in FIG. 1 in position to start. The sheet 11 is under tooth 5. The cutter blade 1 and the receiver 2 are moved, pivoted, away from each other causing the sharp point of tooth 5 to be pushed thru the sheet by the blade lever by which the chip length is cut off and the remainder of the chip is cut out as the tooth 5 enters the snug fit receiver slot 10. The cutting motion is in a circular direction toward the receiver slot. The chip falls free and easily out the bottom of the receiver slot 10 after it has been cut out. The cutter blade and the receiver blade are moved, pivoted, toward each other raising the tooth 5 out of the receiver slot and above the sheet so the sheet and cutter can be moved toward each other for the next chip cut cycle. After the cutter has entered the sheet a short distance the tilt plate 7 holds the sheet down against the receiver when the tooth 5 is withdrawn from the sheet.

I claim:

1. A basically two hand operated, as opposed to a plier type or hand grip trigger type, chipper type as opposed to shear type, sheet metal cutter, which for cutting action is simple levered, as opposed to compound levered, by two levers, one being the receiver blade and the other the cutter blade, long in length in comparison to the size of the cutter blade head, which is shaped basically round, pivoted at the center of the round; with two sawtooth shaped chisel pointed type teeth pointed in opposite directions and extended outward from the perimeter of this basic round, and spaced with their teeth points approximately a half circle distance apart; the teeth points being sharp but flat and the teeth slightly wider, thicker, than that portion of the blade head which passes thru the cut in the sheet metal, the part of the cutter blade passing thru the cut being machined or ground to be more thin, or more narrow in width than the thickness of the teeth and remainder of the head.

2. The basically two hand lever operated, chipper type as opposed to shear type sheet metal cutter of claim 1 with a cutter blade receiver, basically rectangular in shape with total length approximate to the combined length of the cutter blade lever and the cutter blade head; with a slot near the end for entry of the cutter blade head, this slot slightly longer than the shortest distance between the points of the two sawtooth shaped cutter head teeth, and snugly fit at the sides on the top to the center of the sides of the round cutter head and to the sides of the cutter head teeth on entry, and slightly expanded, or tapered wider, toward the bottom; and this slot having a pivot pin for the cutter blade head installed across it and thru the receiver slot sides at apoint of center of the slot length and near its top; above this receiver slot at a variable distance of about one quarter of an inch, and centered horizontal to the receiver slot, on the cutter blade head, are attached two tilt plates, one on each side of the cutter head, and held with a tilt pin thru each of their centers and thru the cutter blade head.

3. The basically two hand two levered sheet metal cutter of claim 1, with a cutter blade being one of these somewhat long levers, and this blade being shaped at its end to a roundish head with two sawtooth shaped chisel point type teeth pointed in opposite directions on opposite sides of its perimeter, each to be used in a separate direction of cutting; and this cutter head being mounted in a fixed pivot position inserted inside a receiver slot between the two receiver slot sides, and held there by a pivot pin thru the center of the cutter blade head and thru the sides of the receiver slot, this receiver slot being part of the receiver blade and near the end of this somewhat long second lever; this assemblage of parts brings the cutter head teeth in a position above the receiver and the receiver slot, and the cutter blade lever extending upward or away from the receiver, thus the cutting tooth is in position, relative to the leverage, to be pushed, as opposed to being pulled or carried thru the sheet; and in a circular movement, as opposed to a straight up and down movement.

* * * * *